United States Patent Office 3,223,815
Patented Dec. 14, 1965

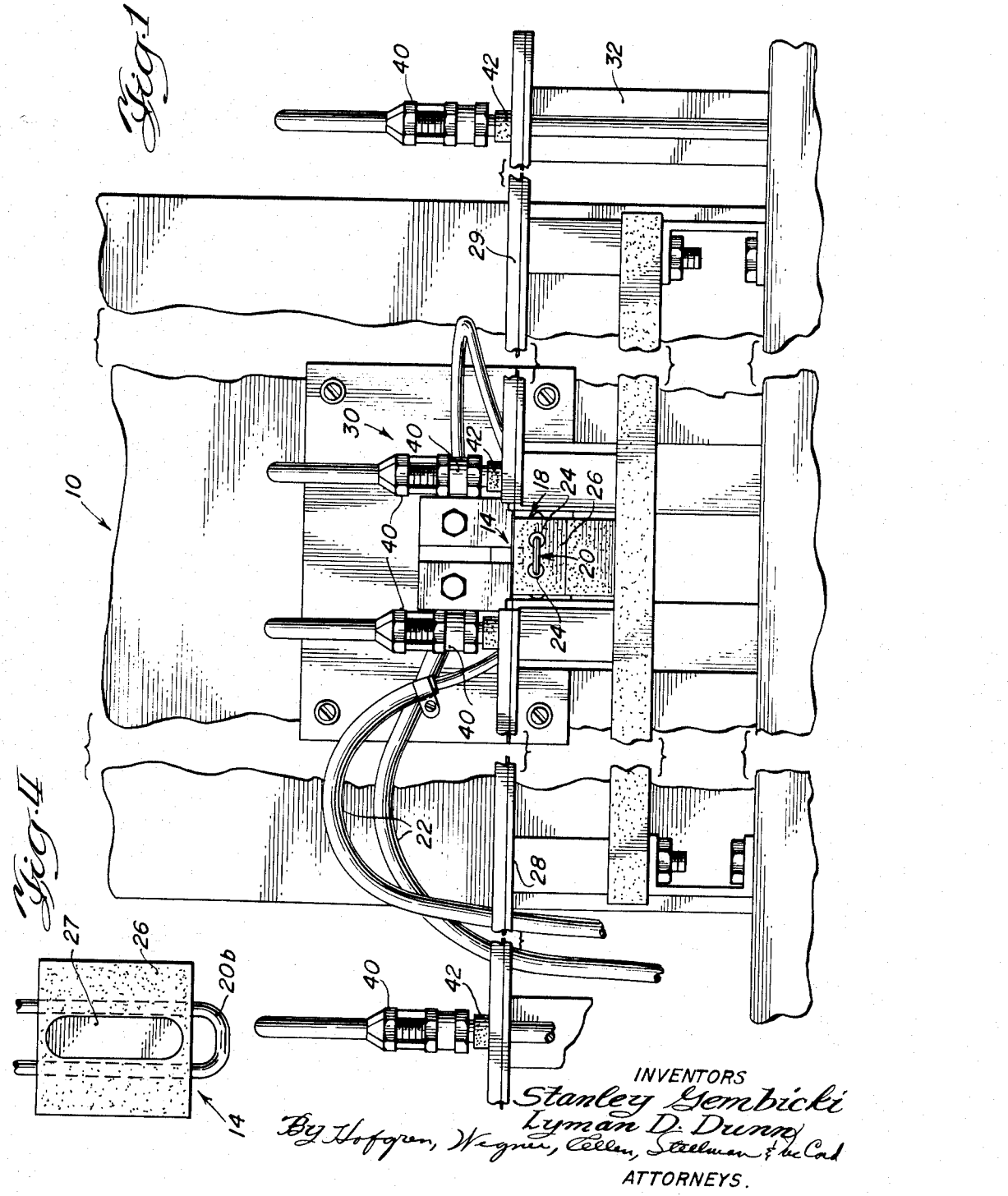

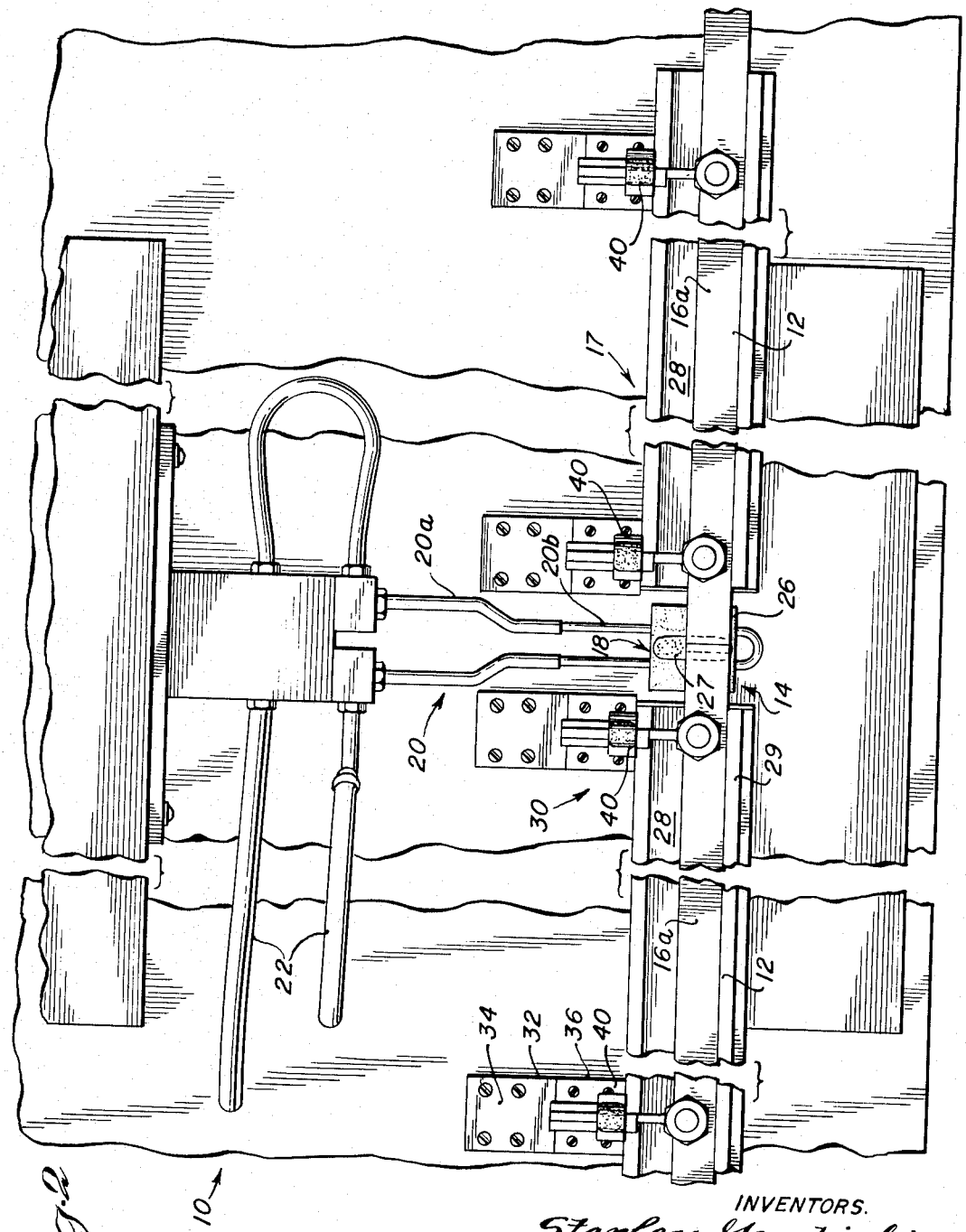

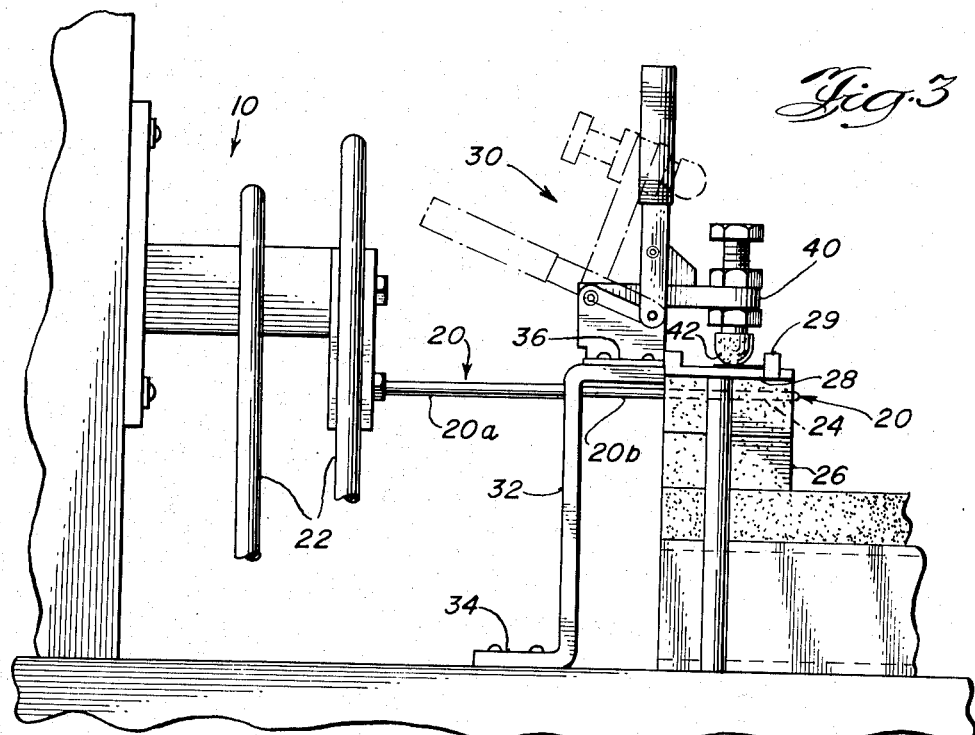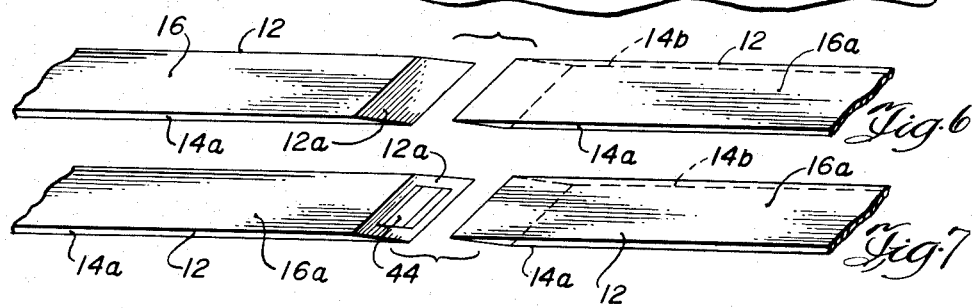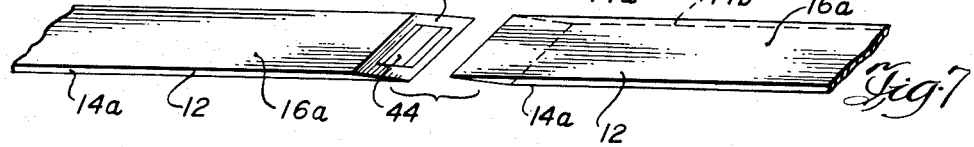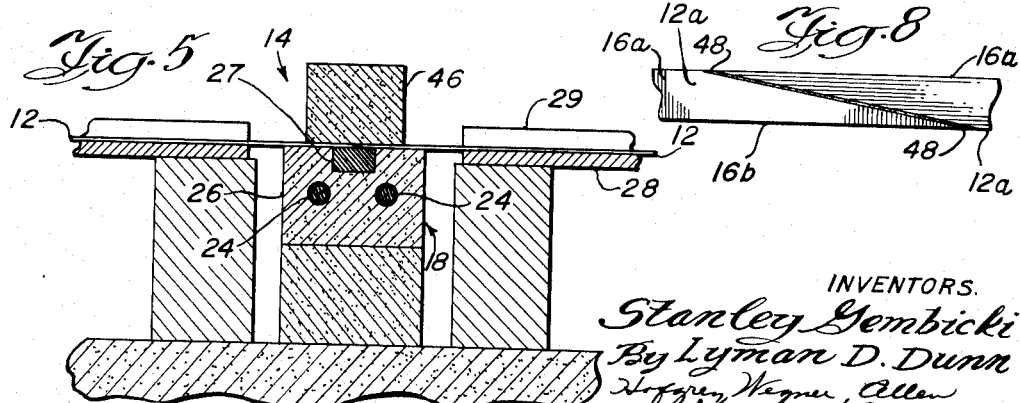

3,223,815
APPARATUS AND METHOD FOR WELDING BAND SAW BLADES
Stanley Gembicki, Des Plaines, and Lyman D. Dunn, Chicago, Ill., assignors to Marlan Company, a corporation of Illinois
Filed Aug. 6, 1964, Ser. No. 387,897
12 Claims. (Cl. 219—9.5)

This application relates generally to the art of welding and more particularly to a new and improved means for welding and brazing band saw blades.

It has been found in the band saw art that thinner band saw blades will cut materials at a faster rate, require less sharpening, and produce less waste during cutting. Thus, it becomes desirable to provide as thin a band saw blade as permissible with due regard to the tension at which the blade must operate as well as the feasibility of joining the free ends of a strip of thin metal to form the continuous blade. Since such band saw blades may be operated under extreme tension, in some cases up to 600 pounds p.s.i. or more under load conditions experienced in starting or during cutting, the strength of the weld, as well as the metal in and about the weld area, must be sufficient to operate under such tension.

One common means of joining the ends of band saw blades to form a continuous loop is through induction welding wherein electric energy is imparted to the blade and the blade molecular activity is increased, producing heat in sufficient quantity to reach welding temperatures. Commonly an induction coil carrying RF energy is placed below the blade with the free ends of the blades juxtaposed and protruding inwardly toward each other and each loop of the coil being adjacent the bevel area of each blade end. Thus, the greater the lap area to be welded, the farther apart must be the RF coils. Other common means of joining the ends of the blades include resistance, torch and bead welding.

In the case of ultra thin blades which have been found to be extremely desirable for use in band saws, the small mass of the blade will not efficiently conduct the heat imparted by the RF energy to the area of the weld. These blades may be generally less than .010″ in thickness, and even as thin as .003″ to .004″. The blade must be heated at a point adjacent the weld area to a temperature which is far above the welding temperature so that the temperature of the weld area will not fall below the welding temperature. Other forms of welding also impart too much heat to the metal in the weld area. This results in a change in the molecular structure of the metal, causing the metal to lose its structural integrity of flexibility and shear strength such that the blade will not be able to withstand the normal operating loads incurred when cutting products ranging from steel to extremely soft foam products. In particular, the molecular structure is changed to such an extent that subsequent annealing, tempering, or other remedial procedures will not restore the metal to its original properties.

It is therefore a primary object of this invention to provide a new and improved method of welding band saw blades.

It is another object of this invention to provide a new and improved method of welding extremely thin metal strips into a continuous band without weakening the structural integrity of the strips.

A further object of this invention is to provide a new and improved apparatus for welding extremely thin metal strips into a continuous band saw blade.

Still another object of this invention is to provide a new apparatus for welding band saw blades capable of creating sufficient heat in a defined area adjacent the blade so that the heat may be conducted to the blade in the area to be joined without weakening the structural integrity of the metal.

Yet another object of this invention is to provide a new and improved method of welding band saw blades by heating a carbon black by an induction coil and conducting the heat from the carbon block to the ends of the band saw blades to be joined which are juxtaposed over the carbon block.

Another object of this invention is to provide a new and improved method of welding band saw blades by brazing the band saw blade ends at a temperature below the annealing temperature for the metal of the blade to join the blade ends and form a continuous loop without changing the molecular structure of the metal or altering its properties.

Still another object of this invention is to provide a new and improved method of welding band saw blades by creating heat in a carbon block adjacent the area of the blade to be joined so that the blade will be heated by conduction to the welding temperature, applying a wetting agent to the area to be joined, and cooling the joint under pressure.

Other objects, features and advantages of the present invention will be apparent from the following description of the preferred embodiment illustrated in the accompanying drawings, in which:

FIGURE 1 is a broken fragmentary front elevational view of the welding apparatus for use with this invention;

FIGURE 2 is a top plan view of the device shown in FIGURE 1;

FIGURE 3 is a side elevational view of the welding apparatus shown in FIGURE 1;

FIGURE 4 is a fragmentary enlarged sectional view of the resistor unit used with this invention;

FIGURE 5 is a fragmentary enlarged upright sectional view through the welding station;

FIGURE 6 is a fragmentary end perspective view of two strips of steel prepared for joining by having the free ends beveled;

FIGURE 7 is a view similar to FIGURE 6 showing the placement of solder on one of the beveled edges; and FIGURE 8 is a fragmentary side elevational view showing the steel strips joined together as a result of the welding method of this invention;

Referring now to the drawings, in FIGURE 1 there is shown the welding apparatus 10 for welding the ends of a strip 12 of extremely thin metal into a continuous band saw blade. Each strip end 12a and 12b has two parallel thin edges 14a and 14b and two parallel flat faces 16a and 16b. The strip ends are held at a welding station 14 so that the ends of the strip may be joined or placed adjacent a heat member 18 which absorbs electrical energy from an induction coil 20 to create heat and conduct the same to the area of the strips being joined.

The basic welding machine utilized may be of one of several well-known structures and is not shown or described in detail herein. For the purposes of this invention, it is sufficient that the apparatus be capable of providing controlled electrical energy to an induction coil for producing heat in an area adjacent the coil. Suitable conduits 22 are provided for cooling the welding apparatus in an area near the source of the electrical energy in a well-known fashion.

The induction coil is a generally U-shaped member extending forwardly of the welder, the front legs of the coil extend through the heat member, being loosely embraced in openings 24 in a retainer block 26. The coil may be a two-piece member having a larger diameter male portion 20a and a smaller diameter female portion 20b. Preferably the coil is made of copper tubing to permit water to be circulated through the coil to prevent overheating of the coil and the retainer block and so that the retainer block will not be so hot as to interfere with the cooling of the welded joint.

Also included in the heat member and positioned at the welding station is a nonmetallic resistor, such as carbon block 27, which is held in the retainer block 26 in a position closely adjacent to the legs of the U-shaped coil member. One face of the carbon block is positioned so that it may abut one face of the metal strip ends which are being joined. The carbon block receives the electrical energy of the induction coil and absorbs the same to produce heat in the carbon block. In turn, this heat is conducted from the carbon block to the strip ends which are to be joined.

The support means for ends of the metal strip includes two channel members 28 which extend in opposite directions from the welding station in linear alignment with each other. The channel members are provided with relatively short upstanding lips, such as 29, along either edge. When each end of the strip is placed with one of each of the respective edges abutting the lips of the channel members, the opposed thin edges 14a and 14b of these strips will be parallel.

For insuring parallelism between the opposite faces 16a and 16b of the two ends, the support is further provided with a plurality of clamping means 30. Each clamping means 30 includes a generally Z-shaped base member 32 having a lower rearwardly trailing leg 34 for securing the same to the platform 35 upon which the apparatus rests and an upward forwardly extending leg 36 to which suitable well-known spring jig clamps 40 are secured. When the clamps are moved to a clamping position with the resilient pads 42 pressing against one face of each of the strip ends, the ends are placed so that the opposed faces are in parallelism. The support means insures that both the opposed edges as well as the opposed faces of the joined strip ends will be maintained parallel, a feature most desirable in band saw blades.

The use of thinner steel stock for blades permits stronger and more brittle steel to be used. Formerly, a standard steel for use in band saw blades had a rating of 40 on the Rockwell "C" scale. With the use of extremely thin band saw blades, steel having a rating of 62 on the Rockwell "C" scale could be used. However, welding the ends of a blade of such thin steel has proved to be a difficult problem to solve. In order to obtain a weld of sufficient strength utilizing silver solder 44, it is necessary to taper each of the ends of the strip to be joined so that there will be an overlap or weld area of sufficient dimension to permit enough silver solder to wet the area to be joined to maintain a tensile strength in the weld area which is substantially equivalent to that of the rest of the blade stock. Because the steel is extremely thin, the beveled ends which are to be juxtaposed for joining must extend for a relatively great length of the blade in order to provide the required surface area. The greater the area of the blade ends to be joined, the farther apart must be the induction coils on the welding machine to weld the blade ends by the conventional or well-known methods. However, it was found that with a blade stock of .010" in thickness, the steel had to be heated to a temperature of 2000° in order to produce a temperature of 1170° in the middle of the joint. Such a high temperature at the outside of the lap area altered the structural integrity of the steel, weakening it to such an extent that the blade could not operate under the required conditions.

The solution found was to place the induction coil within an insulated retainer block substantially below the level of the metal strips to be joined and adjacent to a high resistor, such as the carbon block. As electrical energy is passed through the induction coil, the carbon block will be heated. In turn, the carbon block is positioned so that it is adjacent one face of the blade to be joined. In such a position, heat can be transferred directly from the carbon block to the blade.

To prepare the metal strips for joining into a continuous loop band saw blade, the free ends of the strip are first prepared by forming the necessary bevel on the ends and then dipping the ends into a suitable cleansing bath, such as acid. A well-known flux may be applied and then the free ends of the blade are placed in the support means and clamped therein so that the strip is secured about its common center line to maintain parallelism of the edges and the opposed faces as well. The ends are positioned so that the bevels overlap each other in mating relationship. A wetting agent, such as silver solder, is then inserted between the beveled portions and electrical energy is supplied to the induction coil to heat the carbon block.

One face of the carbon block is exposed in the face of the insulated retainer at the welding station. Because the carbon block has a defined surface area, as well as a defined mass, and because it is heated substantially uniformly in response to electrical energy passed through the induction coils, the strip ends which are positioned over the carbon block are likewise heated in a defined area at the welding station. This provides means hitherto unknown in the art for heating the strip ends of ultra-thin metal strips to welding temperatures without destroying the structural integrity of the areas adjacent the joint.

We have found that the relative size and positioning of the coils and the carbon block are a factor in the success of the welding operation of this invention. If, for instance, the coil is positioned too close to the blade, then there will not be an even transmission of RF energy from the carbon block to the blade, and, in fact, the blade will directly absorb some of the RF energy from the coil. If the loop of the coil is too narrow, then the RF energy will not be effectively transmitted to the carbon block. The width of the carbon block will depend on the dimension of the lap joint being welded. As an example, we have found that for welding a blade of approximately .010" or less in thickness, the blade ends should be beveled to provide approximately a ¼" lap joint. Preferably a carbon block should be used which is approximately 5/16" in width, 1½" in length (this may vary with the width of the blade), and ¼" in depth. The coils used are preferably copper tubing which is approximately ⅛" in diameter and formed in a loop approximately 7/16" wide. The carbon block is positioned in the retainer block so that it is directly centered between the loop (or spaced 1/16" in from the side of the loop) and so that it is 1/16" above the openings formed in the retainer block for the loop of the copper tubing. We have found that these relative dimensions of the several components produce an extremely satisfactory weld in a blade of approximately .010" in thickness according to the methods and apparatus of this invention.

An electrical energy is passed through the induction coils, the temperature of the carbon block is raised. The steel strips are brought to a temperature which is below the annealing temperature of the metal by raising the temperature of the carbon block to the desired tempering temperature and holding the temperature of the block and metal strips to obtain a good wetting action by the solder. For example, in welding a carbon steel blade having a Rockwell hardness of 62C, being .004" in thickness and ½" in width, the carbon block should be heated for approximately 45 seconds to bring the strip ends to temperatures which are below the annealing temperature, but within the melting and flow temperatures of the solder used, and this temperature should be held for 5 to 10 seconds. Where silver solder is used, the strip should be heated to 1145° to 1170° F.

It has been further found desirable to cool the welded joint under pressure for a limited duration of time. To this end, it has been found extremely helpful to place a block of refractory material, such as a lava block 46, over the welded joint after the solder has been allowed to flow for the desired length of time and press down over the joint with manual pressure. The hot welded joint will seize the lava block and hold the block against the joint under pressure, pulling the beveled ends together as the joint slowly cools. The pressure increases until the stress in the weld becomes equal to that of the blade at which time the lava block will be released or "pop off" the welded area.

As the block squeezes down on the welded joint, some of the solder will be squeezed out between the lap ends and fill the minute crevices of either face of the blade formed by the gap between the relatively blunt tip 48 of one end of the bevel and the remaining lap 12a of the mating bevel. Any excess solder may be easily wiped away with a fine polishing substance, such as emery cloth or the like, once the joint has cooled.

The method and apparatus of this invention provides a means for welding extremely thin metal strips to form a continuous loop band saw blade capable of withstanding the normal forces imposed on the blade during cutting. Thus, this invention permits the use of ultrathin band saw blades which give an improved cutting action heretofore unknown. The structural integrity of the blade in the area adjacent the weld is not significantly altered but retains substantially all of its original characteristics. All previously known means of joining metal strips to form a band saw blade require the additional step of annealing the joined area to restore some of the original properties of the metal, such as flexibility, tensile strength. At best, the annealed joint may have a tensile strength which is 40% of that of the original tempered metal. The welding method and apparatus of this invention results in a welded joint which retains substantially all of its original tempered properties (75 to 80% of the tensile strength) without the need for annealing the joint. The conduction of heat from the carbon block resistor, which absorbs the RF energy to the blade, efficiently creates a sufficient amount of heat in a defined area so that this improved weld is made possible. Cooling under pressure of the lava block which affixes itself to the blade further insures the structural integrity of the joint as well as the parallelism of the blade faces.

While I have shown and described certain embodiments of my invention, it is to be understood that it is capable of many modifications. Changes, therefore, in the construction and arrangement may be made without departing from the spirit and scope of my invention as set out in the appended claims.

We claim:

1. The method of joining the ends of very thin metal band saw blades comprising the steps of: placing the opposed ends of the blade in juxtaposition for joining; positioning each of the ends on a nonmetallic resistor element so that the element and ends are in heat conductive contact placing a wetting agent on the opposed ends; inducing RF energy in an area adjacent the resistor to heat the resistor and thereby heat said ends to be joined in an area defined only by the face of the resistor raising the temperature of the ends slowly to a temperature which is within the melting and flow temperature of the wetting agent but below the annealing temperature of the metal strips and maintaining the desired temperature while the wetting agent wets both ends of the strips; and cooling the ends while subjecting the ends to pressure to force the opposed faces of the wetted ends together.

2. The method of joining the ends of very thin metal strips comprising the steps of: providing a nonmetallic resistor applying solder to the ends to be joined; placing the opposed ends of the metal strips in juxaposition for joining; positioning each of the ends on a carbon block so that the block and strips are in heat conductive contact; providing a source of RF energy adjacent the carbon block to heat the block and thereby heat the metal strips in an area defined by the carbon block; raising the temperature of the block and the metal strips slowly to a tempering temperature and holding the same at such temperature while said solder wets both metal strips; and placing a lava block over both strip ends including the joint and carbon block to force the strip ends together and control the rate of cooling of the joint; and permitting the welded joint to cool in ambient surroundings.

3. The method of claim 2 including the steps of beveling the opposed ends of the metal strips prior to juxtapositioning the same for joining.

4. The method of joining the ends of metal strips of less than .012" in thickness comprising the steps of: providing a nonmetallic resistor placing silver solder on the ends of the strips to be joined; positioning each of the ends on a carbon block so that the block and strips are in heat conductive contact and so that the opposed ends of the metal strips are in juxtaposition for joining; raising the temperature of the block and metal strips slowly to a temperature of between 1145° and 1170° F. to heat the metal strips in the area of the carbon block and holding the same at such temperature while the solder wets both steel strips between five to ten seconds; and placing a lava block over both strip ends including the carbon block and joint to force the ends together and control the rate of cooling thereof; and permitting the joined ends to cool for at least forty seconds in ambient surroundings.

5. A welding station for joining the ends of very thin metal strips, comprising: a nonmetallic resistor, an induction coil about said resistor; means for holding the metal strips at said station in heat conductive contact with said resistor and spaced from said induction coil; means providing a source of energy to said coil to heat said resistor and thereby heat said strips to a wetting temperature; and means for applying pressure to said strips after the ends have been heated to the wetting temperature to maintain the structural integrity of the strips in the area adjacent the joint.

6. The welding station of claim 5 wherein said nonmetallic resistor is a carbon block.

7. The welding station of claim 5 wherein said means for applying pressure comprises a lava block superimposed over the welded joint and the carbon block and held thereat while said joint cools in ambient surroundings.

8. A welding station for joining the ends of very thin metal strips, comprising: a carbon block; an induction coil about said block; a support for holding the ends of the strips to be joined over said carbon block and spaced from said induction coil; means providing a source of energy to said coil to produce heat in said block for heating said strips in the area defined by the block to a wetting temperature; and a lava block having a substantially flat face of a size to cover the ends of the strips being joined so that when the lava block is placed over the end of the strips and the carbon block it holds the welded joint together and absorbs heat from the joint as the joint cools in ambient surroundings to control the rate of cooling and insure parallelism between the faces of the welded blade.

9. The method of joining the ends of thin metal strips comprising the steps of: placing opposed ends of the strips in juxtaposition for joining; positioning each of the ends on a nonmetallic resistor element so that the element and ends are in heat conductive contact; placing a wetting agent on the opposed ends; inducting RF energy in an area adjacent the resistor to heat the resistor and thereby heat said ends to be joined in the area defined by the face of the resistor; raising the temperature of the ends slowly to a temperature which is within the melting and flow temperature of the wetting agent but below the annealing temperature of the metal strips and maintaining the desired temperature while the wetting agent wets both ends of the strips; and subsequently cooling the resultant joint.

10. The method of joining the ends of thin metal strips comprising the steps of: placing opposed ends of the strips in juxtaposition for joining; positioning each of the ends on a nonmetallic resistor element so that the element and ends are in heat conductive contact; placing a wetting agent on the opposed ends; inducing RF energy in an area adjacent the resistor to heat the resistor and thereby heat said ends to be joined in the area defined by the face of the resistor, raising the temperature of the ends slowly to a temperature which is within the melting and flow temperature of the wetting agent but below the annealing temperature of the metal strips and maintaining the desired temperature while the wetting agent wets both ends of the strips; and subjecting the ends to pressure and subsequently cooling the resultant joint.

11. A welding station for joining the ends of very thin metal strips, comprising: a nonmetallic resistor; an induction coil about said resistor; means for holding the metal strips at said station in heat conductive contact with said resistor and spaced from said induction coil; means providing a source of energy to said coil to heat said resistor and thereby heat said strips in an area defined by said resistor to a wetting temperature, and inducing heat in said strips for a sufficient length of time to join said ends.

12. A welding station for joining the ends of very thin metal strips, comprising: a nonmetallic resistor; an induction coil about said resistor; means for holding the metal strips at said station in heat conductive contact with said resistor and spaced from said induction coil; means providing a source of energy to said coil to heat said resistor and thereby heat said strips in an area defined by said resistor to a wetting temperature; and a nonmetallic block for applying pressure to said strips after the ends have been heated to the wetting temperature to maintain the structural integrity of the strips in the area adjacent the joint.

References Cited by the Examiner
UNITED STATES PATENTS

| | | | |
|---|---|---|---|
| 1,561,224 | 11/1925 | Fritsche | 219—85 |
| 1,566,674 | 12/1925 | Horta | 219—85 |
| 1,580,794 | 4/1926 | Seltzer | 219—85 |
| 1,748,551 | 2/1930 | Helle | 219—85 |

RICHARD M. WOOD, *Primary Examiner.*